United States Patent [19]

Akao et al.

[11] Patent Number: 5,163,556
[45] Date of Patent: Nov. 17, 1992

[54] PACKED ASSEMBLY OF ROLL-FORM PHOTOGRAPHIC LIGHT-SENSITIVE MATERIALS

[75] Inventors: Mutsuo Akao; Tatsuo Sugii; Hiroyuki Osanai; Koji Inoue, all of Kanagawa, Japan

[73] Assignee: Fuji Photo Film Co., Ltd., Kanagawa, Japan

[21] Appl. No.: 576,946

[22] Filed: Sep. 4, 1990

[30] Foreign Application Priority Data

Sep. 4, 1989 [JP] Japan .................... 1-103775[U]

[51] Int. Cl.⁵ .......................................... B65D 85/672
[52] U.S. Cl. ................................ 206/394; 206/303; 206/455; 206/497
[58] Field of Search ............... 206/454, 455, 391, 394, 206/303, 497, 499, 386, 597

[56] References Cited

U.S. PATENT DOCUMENTS

| | | | |
|---|---|---|---|
| 1,134,525 | 4/1915 | Gallagher | 206/499 |
| 1,898,857 | 2/1933 | Theiss . | |
| 4,079,835 | 3/1978 | Kendig | 206/303 X |
| 4,469,741 | 9/1984 | Akao . | |
| 4,537,307 | 8/1985 | Tamura | 206/455 |
| 4,570,794 | 2/1986 | Capitao, Jr. | 206/394 |
| 4,708,246 | 11/1987 | Minion | 206/394 |
| 4,760,915 | 8/1988 | Boets et al. | 206/597 X |
| 4,792,044 | 12/1988 | Nishizawa et al. | 206/394 |
| 4,955,471 | 9/1990 | Hirose et al. | 206/303 |

FOREIGN PATENT DOCUMENTS

| | | |
|---|---|---|
| 221203 | 5/1987 | European Pat. Off. . |
| 2815715 | 10/1979 | Fed. Rep. of Germany ...... 206/394 |
| 925574 | 9/1947 | France . |
| 2554086 | 5/1985 | France . |

OTHER PUBLICATIONS

Research Disclosure, Nov. 1982, NR 22324, H. Mouly.

Primary Examiner—Bryon P. Gehman
Attorney, Agent, or Firm—Burns, Doane, Swecker & Mathis

[57] ABSTRACT

A packed assembly of roll-form photographic light-sensitive materials comprising a substantially disk-shaped supporting member fixed to a pallet. The supporting member has a concave portion near the center thereof. An assembly of roll-form photographic light-sensitive materials is placed on the supporting member in a piled state, a central post inserted into the assembly through the cores of the photographic light-sensitive materials and is fixed to the concave portion of the supporting member at the lower end and to a flange cap at the upper end, and a light-shielding material is closely place around the assembly in a light-tight state.

2 Claims, 9 Drawing Sheets

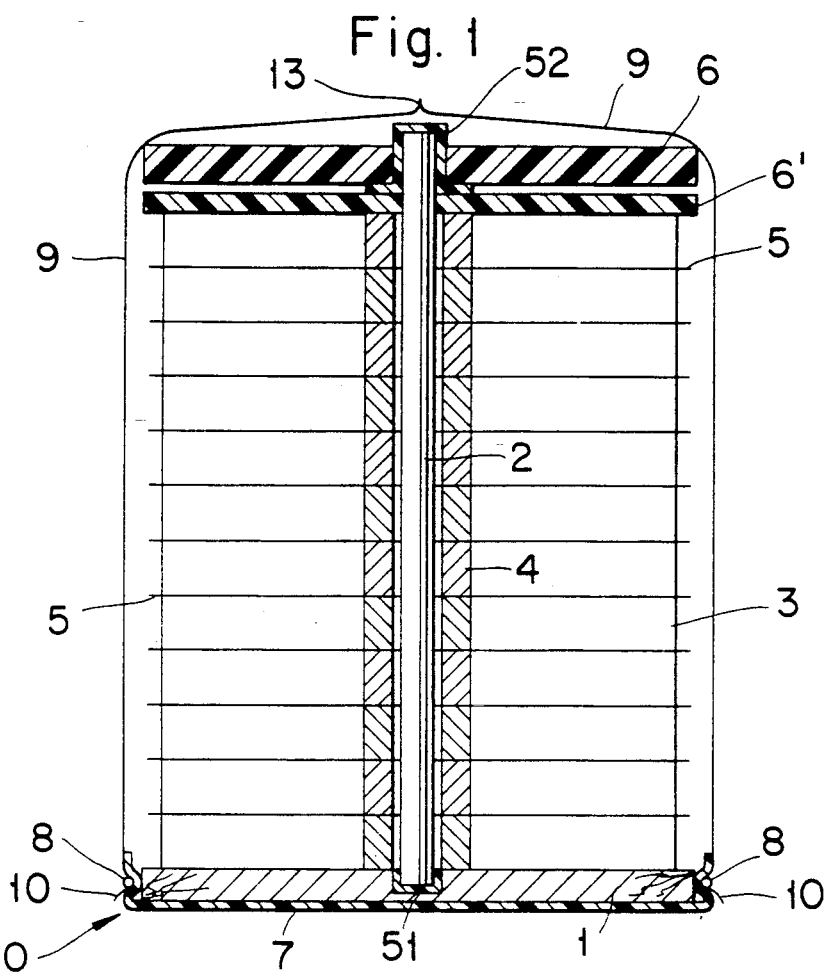
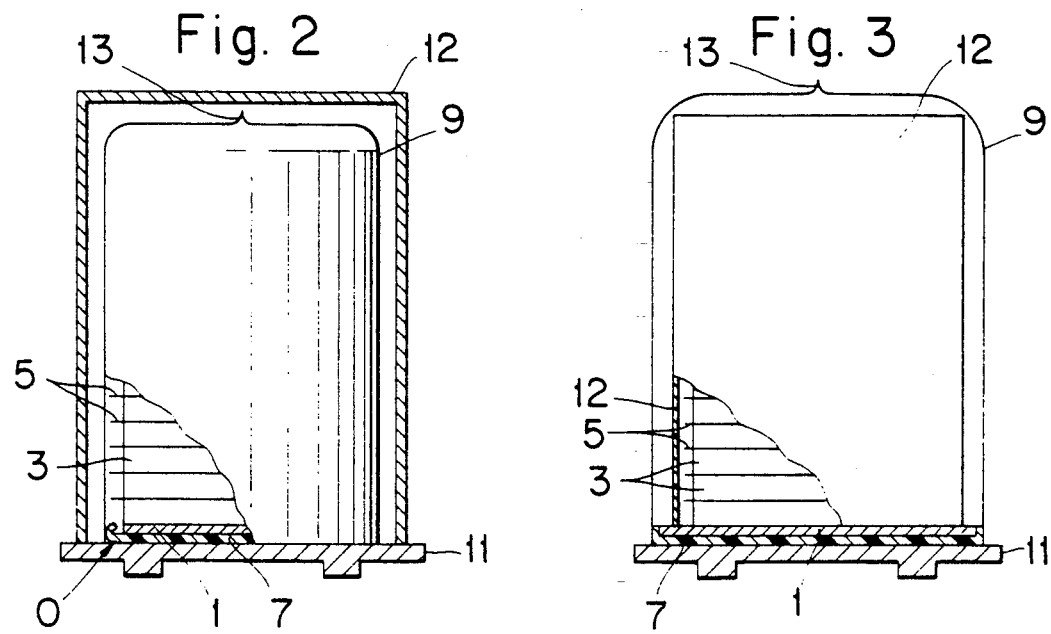

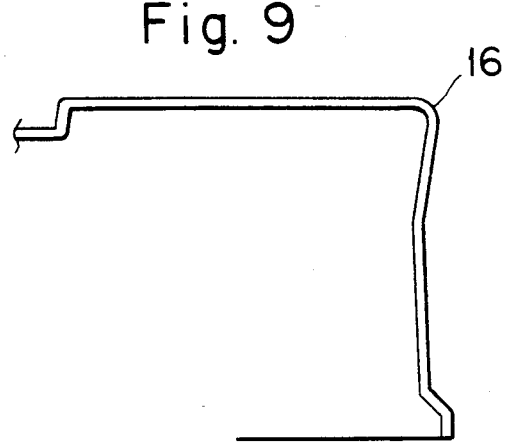
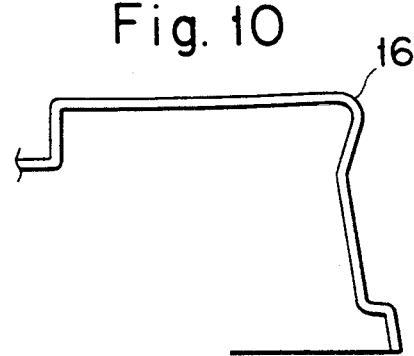
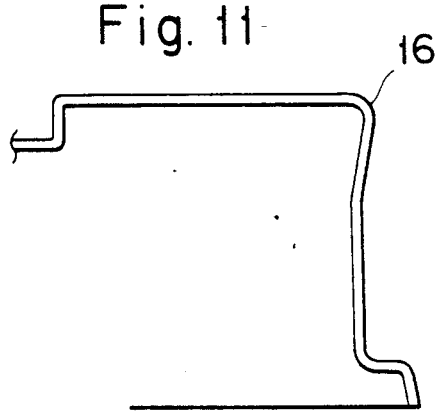
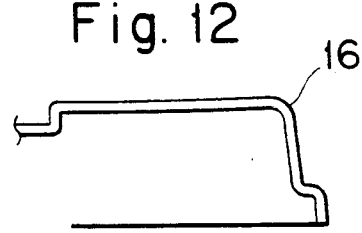
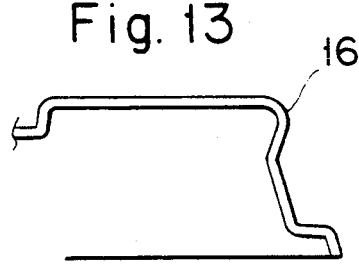

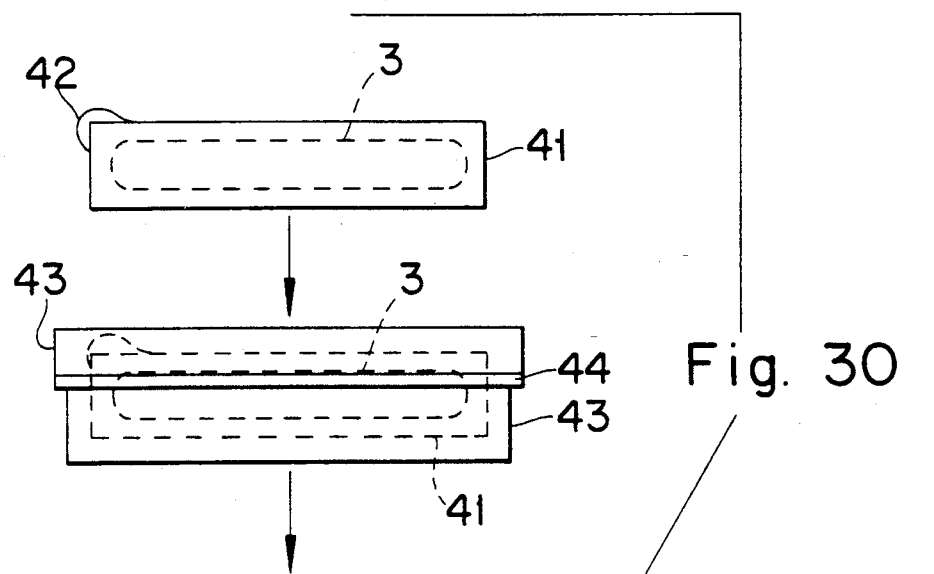
Fig. 30
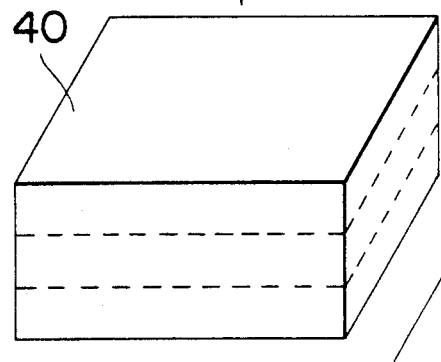
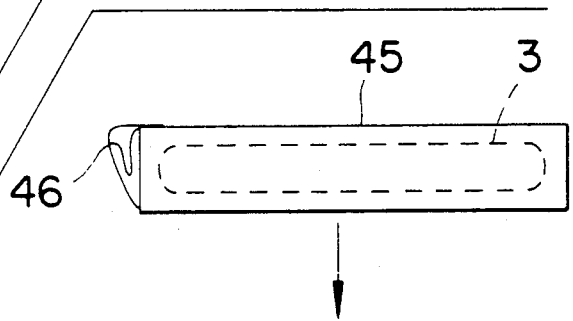
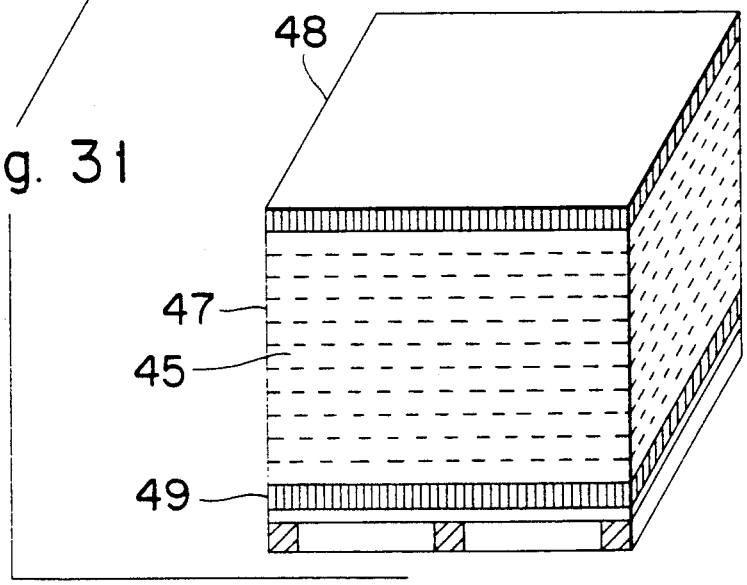
Fig. 31

PACKED ASSEMBLY OF ROLL-FORM PHOTOGRAPHIC LIGHT-SENSITIVE MATERIALS

FIELD OF THE INVENTION

This invention relates to a packed assembly of roll-form photographic light-sensitive materials.

BACKGROUND OF THE INVENTION

In general, a roll-form of photographic light-sensitive material (film) is wound round a core 4 made of a polystyrene resin to form a roll-form photographic light-sensitive material 3 and the end of the roll form photographic light-sensitive material 3 is fixed by an adhesive tape or a seal 23 as shown in FIG. 29.

Hitherto, for packing the aforesaid roll-form photographic light-sensitive material 3, as shown in FIG. 30, the roll-form photographic light-sensitive material 3 is placed in a packaging bag 41 followed by sealing with an adhesive tape 42, the package thus prepared is placed in a metal can 43, and the joining portion with the cap of the can is sealed with a light-shielding adhesive tape 44 for keeping moisture-proofness and light-shielding. Also, about three such metal cans 43 each containing the light-sensitive material are placed in a corrugated cardboard box 40 in a piled state and the box is sealed by an adhesive or an adhesive tape to finish the package of the assembly of roll form photographic light-sensitive materials 3.

In another packaging system for roll for photographic light-sensitive materials as shown in FIG. 31, a roll-form photographic light-sensitive material 3 is placed in a unitary packaging bag 45 having a high physical strength followed by sealing with a tape 46 and about 20 unitary packaging bags 45 each containing the roll form photographic light-sensitive material are placed in a corrugated cardboard box composed of side boards 47, an upper lid 48 and a lower lid 49 (see *Hooso Gijutsu (Packaging Technology)*, No. 12, 44–47(1983).

However, the conventional package using the metal can 43 requires a very high cost, the step of forming the package of the assembly of the roll form photographic light-sensitive materials is complicated, and furthermore, the work of opening the can and taking out each roll form photographic light-sensitive material 3 from the can at the laboratory is troublesome. Also, it is technically difficult to make a metal can even using an expensive and large scale pressing machine and hence in the case of a roll form photographic light-sensitive material having a large diameter, packaging thereof is impossible by such a conventional technique. Moreover, metal cans have a large bulk and hence there is a problem on the waste disposal after use.

The package of piled large unitary packaging bag 45 having a high mechanical strength gives less waste and the cost of the packaging materials is low. However, each roll-form photographic light-sensitive material 3 must be placed in each unitary packaging bag 45 and also each roll-form photographic light-sensitive material must be withdrawn from the unitary packaging bag in the laboratory, which is troublesome. In particular, in a large laboratory handling a large amount of roll-form photographic light-sensitive materials 3 having a large diameter, the workability is poor and hence a packaging system for roll-form photographic light-sensitive materials wherein the light-sensitive material can be removed without any problem has been desired.

SUMMARY OF THE INVENTION

The object of this invention is to solve the aforesaid problem and to provide a packed assembly of roll form photographic light-sensitive materials, wherein the packing for roll-form photographic light-sensitive materials and the removal of the light-sensitive materials are simple, load shifting does not occur during transportation of the package, and the cost for the package is low.

It has now been discovered that the aforesaid objects can be attained by the present invention as set forth hereinbelow.

That is, according to this invention, there is provided a packed assembly of roll-form photographic light-sensitive materials comprising a substantially disk-shaped supporting member fixed to a pallet, said supporting member having a center concave portion, an assembly of roll-form photographic light-sensitive materials placed on the supporting member, a central post inserted into the assembly and fixed to the supporting member at the lower end to a flange cap at the upper end, and a light-shielding material closely packaging the assembly in a light-tight state.

BRIEF DESCRIPTION OF THE DRAWINGS

FIG. 3 is a schematic sectional view showing a still other example of the packed assembly of this invention.

FIG. 9 to FIG. 25 are each a schematic sectional view of a typical portion of each light-shielding pedestal.

FIG. 30 and FIG. 31 are views each showing the production step of a conventional packed assembly of roll-form photographic light-sensitive materials.

DETAILED DESCRIPTION OF THE INVENTION

Figure 4:
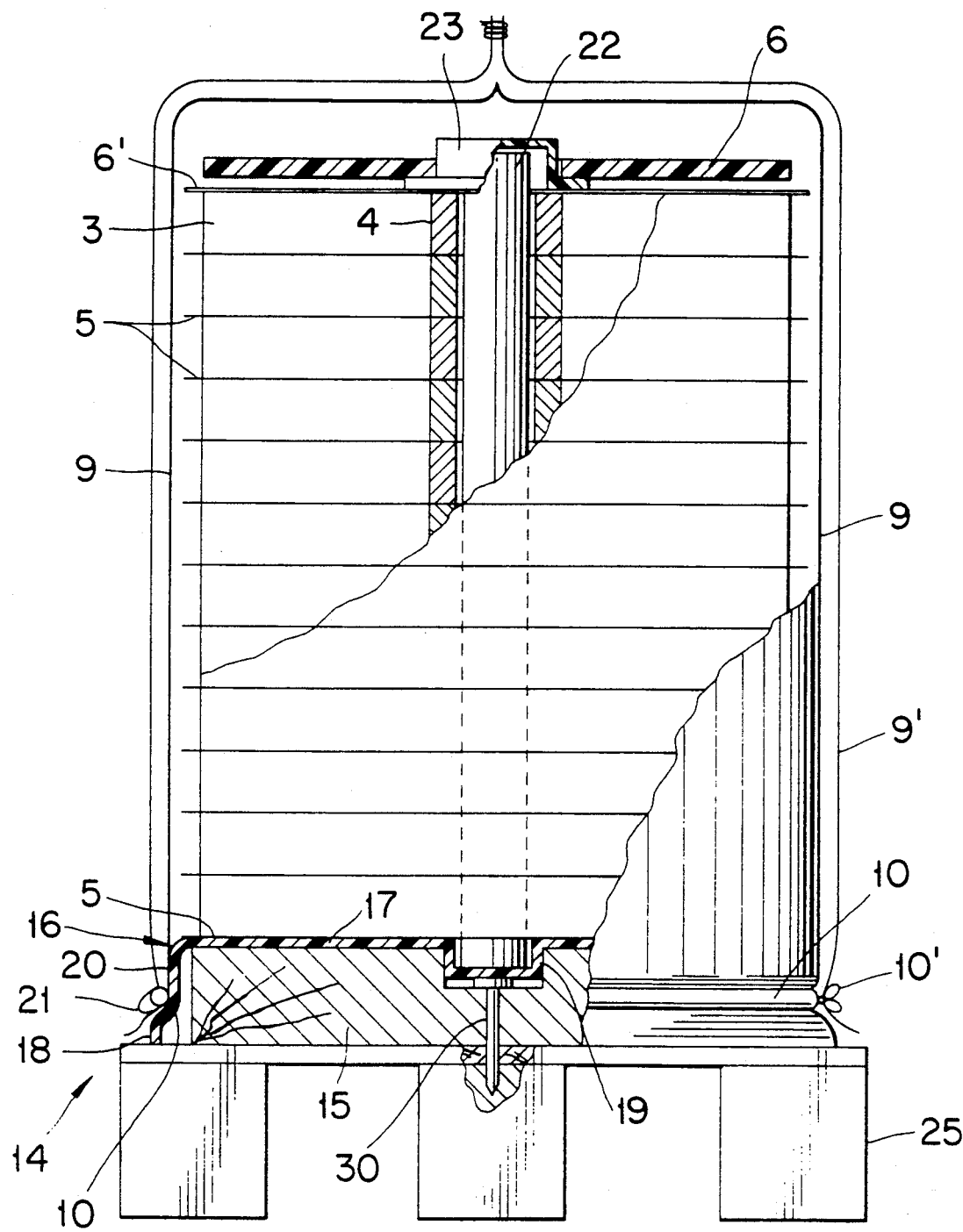
FIG. 4 is a partial sectional view of the packed assembly of roll-form photographic light-sensitive materials in the second embodiment of this invention.

Each packing materials which is used for the packed assembly by directly contacting the photographic light-sensitive material or by forming a proper space with the photographic light-sensitive material without inserting an intercepting packing material can be composed of a material containing materials causing dust or giving adverse influences on the photographic light-sensitive materials, and are most preferably composed of a plastic considering the points that the physical strength is excellent and the cost is low.

The supporting member which performs an important role in this invention for giving excellent light-shielding property and workability is a central post at a concave portion near the center in light-tight state for supporting the assembly of roll-form photographic light-sensitive materials in light-tight state and without causing load shifting of the assembly during transporting, and may be formed by a single material or a combination of a light-shielding pedestal and a pressure resisting member if the light-shielding property is not disturbed by attachment to the pallet.

In the case of combining the light-shielding pedestal and the pressure resisting member, if the light-shielding property can be secured by the light-shielding pedestal, the pressure resisting member is not required to have a light-shielding property and hence an inexpensive packing material such as wood, a corrugated cardboard, etc., can be used for the pressure resisting member even if these materials are inexpensive materials giving adverse influences such as fogging and the increase or decrease of the light sensitivity to the photographic light-sensitive materials.

The light-shielding pedestal can be formed using various kinds of materials if they have a light-shielding property as well as a desired moisture-proofness and physical strength. For example, various kinds of thermoplastic resins or thermosetting resins containing from 0.1 to 10% by weight, and preferably from 0.3 to 3% by weight a light-shielding material, said resin inhibiting the generation of refuse and being moldable into complicated forms. Typical examples of the preferred resins are polyolefin resins, ABS resins, high impact polystyrene resins, propylene-ethylene copolymer resins, high-density polyethylene resins, and polyolefin resins kneaded with a synthetic rubber or an elastomer resin. Furthermore, one or more kinds of the aforesaid thermoplastic resins can be also blended.

For the pressure resisting member in this invention, various materials having a physical strength enduring the pressure of the assembly of roll-form photographic light-sensitive materials can be used even if they give adverse influences on the photographic light-sensitive materials. Wood-made or paper materials are particularly preferred since they can be fabricated into various forms, they are light weight and inexpensive, they have a relatively high strength, they can be easily subjected to a waste treatment, and also they are easily available.

Figure 25:
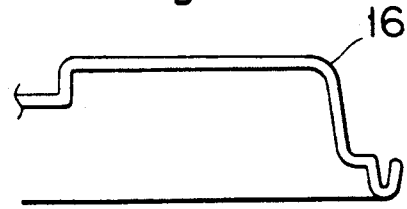

It is preferred that the front surface of the light-shielding pedestal is formed in curved form or roundish without corners for preventing workers from being injured, the photographic light-sensitive materials from being scratched, and the light-shielding material or bag from being broken or pinholed. If necessary, it is preferred that the light-shielding pedestal is curled as shown in FIG. 25.

It is also preferred that the lower part of the light-shielding pedestal has a large diameter and is formed in stages since in such a case, at the case of binding the light-shielding bag with a band or a cord, the bound position can be easily confirmed and the band or the cord does not fall while transporting the packed assembly.

The height or the depth of the light-shielding tray or pedestal is preferably in the range of from 10 to 100 mm from the points of easiness of packing work and the cost. Also, the thickness of a light-shielding sheet for forming the light-shielding tray or pedestal is preferably in the range of from 0.2 to 5 mm in the case of forming a vacuum molding method and in the range of from 0.7 to 5 mm in the case of forming an injection molding method from the point of the balance among the cost, the quality, and the moldability.

The central post or rod is inserted through the piled cores of the roll-form photographic light-sensitive materials and is fixed to the concave portion near the center of the supporting member at the lower end and to the cap at the upper end, thereby it prevents the packed assembly from moving from the supporting member and the roll-form photographic light-sensitive materials from load shifting. Therefore, the central post may be a plastic pipe such as a vinyl chloride resin pipe, a polypropylene resin pipe, a polyethylene resin pipe, etc., a metal pipe, a paper pipe, various plastic rods, metal rods, wood rods, etc., which can fix the assembly of roll-form photographic light-sensitive materials. Also, the sectional form of the post may be circle, a polygon, etc.

The central post may be a system that after placing a number of roll-formed photographic light-sensitive materials on the supporting member such that each core is superposed on each other core, the post is inserted through the central spaces (holes) of the cores and fixed to the concave portion of the supporting member at the lower end or in this case, the lower end of the central post may simply placed in the concaved portion of the supporting member.

The upper end of the post is fixed to the cap for preventing the fixed portion from being damaged by vibration during the transportation of the packed assembly and the central post from slipping from the concave portion of the supporting member. The cap and the concave portion of the supporting member have a size larger than the size through which the central post can be inserted and the depth thereof is from 3 to 100 mm, and preferably from 5 to 50 mm.

The light-shielding material, or a light-shielding bag as a preferred practical form, closely packs the assembly of roll-form photographic light-sensitive materials for ensuring the light-shielding property. For the light-shielding bag, various kinds of light-shielding films or sheets can be used as long as the light-shielding property for the light-sensitive materials can be secured. Examples thereof are a light-shielding L-LDPE resin inflation film, a light-shielding polyolefin resin inflation film, a multilayer coextruded light-shielding thermoplastic resin film, and a laminate film. A laminate film having an ethylene copolymer resin film or a polyolefin resin film containing an ethylene copolymer is preferred since the film is inexpensive, has a good heat seal aptitude, and is excellent in physical strength.

In particular, a multilayer co-extruded inflation film composed of a thermoplastic resin containing a light-reflecting, light-shielding material as the outer layer and a thermoplastic resin film containing a light-absorptive light-shielding material as the inner layer is preferred. Also, a multilayer co-extruded light-shielding inflation film composed of a light-shielding thermoplastic resin film having a high softening point as the outer layer and a light-shielding thermoplastic resin as the inner layer is preferred.

For closely sealing the assembly of roll-form photographic light-sensitive materials with the light-shielding bag, the open lower end portion of the light-shielding bag may be airtightly attached to the light-shielding pedestal or the open lower end portion may be bound. Also, in the former case, the open end of the light-shielding bag may be directly fixed to the light-shielding pedestal or through other attachment member.

The fixing of the lower opening portion to the light-shielding pedestal may be conducted by tying with a cord, a band, a rubber band, etc., or may be conducted with an adhesive, a sticking agent, an adhesive tape, a hot melt welding, etc. In this invention, the light-shielding material is not in the form of a light-shielding bag and a sheet-form light-shielding film (such as a light-shielding molecularly-oriented or stretched film, a light-shielding unstretched film, a light-shielding laminated film, a light-shielding stretchable film and a light-shielding shrink film) is wound round the assembly of roll-form photographic light-sensitive materials with sealing at the upper and lower portions to provide a packed assembly.

As a fixing means can be used a light-shielding pedestal (or light-shielding tray) having a concave groove or convex line on the side face for tying the light-shielding bag. The width of the concave groove or the convex line is from 0.3 to 10 cm, and preferably 0.5 to 5 cm, the depth thereof is from 0.1 to 5 cm, and preferably from 0.3 to 2 cm, the height thereof is from 1 to 10 cm, and preferably from 2 to 6 cm, and the form of the concaved groove or convex line maybe a polygon, circle, ellipse, etc. Furthermore, two or more concave grooves or convex lines may be formed.

The light-shielding pedestal (light-shielding tray) is formed by a plastic, a metal, a fiber drum, a corrugated cardboard, etc.

The roll-form photographic light-sensitive materials include, e.g., cine positive film, color photographic papers, microfilms, photocomposing printing papers, photocomposing films, COM films, etc., and they also include heat-sensitive recording papers, heat-sensitive films, light-sensitive resin films, heat-development type light-sensitive materials, etc. Also, the invention can be further applied to magnetic recording materials, pressure-sensitive recording papers, decorative ribbons, etc.

Also, the core of the roll-form photographic light-sensitive material may be composed of a plastic, a metal, a paper, etc.

It is preferred that a buffer sheet or a separate sheet such as a plastic sheet, a foam sheet, a nonwoven fabric, a laminate film, etc., is formed between the roll-form photographic light-sensitive materials for securing the quality of the photographic light-sensitive materials and/or for separating each roll-form photographic light-sensitive material from the assembly for sending to a processor.

As the buffer sheet, a plastic sheet containing at least one of a lubricant, an antistatic agent, a light-shielding material, a surfactant, and an electrically conductive material is preferably used in the interest of inhibiting the occurrence of static marks on the photographic light-sensitive materials and inhibiting dust adsorption by static electricity. Also, for static prevention, the improvement of smoothness, etc., it is preferred to apply embossing of various forms (e.g., a silk cloth pattern, a sand pattern, a rope pattern, a checked pattern, a crepe pattern, and fine grained surface described in *Bealon Sibo*, published by Tokyo Bealon K. K.) to the buffer sheet.

As described above, in the packed assembly of roll form photographic light-sensitive materials, the light-shielding pedestal supports thereon an assembly of roll-form photographic light-sensitive materials while securing the light-shielding property, the movement of the packed assembly placed on the supporting member from the supporting member is prevented and load shifting of the assembly of roll-form photographic light-sensitive materials is prevented by the supporting member fixed to the pallet and the central post fixed to the concave portion near the center of the supporting member at the lower end and to the flange cap at the upper end, and also in the case of forming separate sheets between each roll-form photographic light-sensitive materials, the sheet secures the quality of the photographic light-sensitive materials and makes it possible to easily separate each roll-form photographic light-sensitive material from the packed assembly. Furthermore, the light-shielding bag closely packs the assembly of roll-form photographic light-sensitive materials to secure the moistureproofness, the gas barrier property, and the light-shielding property. Also, the light-shielding tray or light-shielding pedestal at the supporting member secures the light-shielding property, and the pressure resisting member fixed to the pallet prevents the movement or transfer of the packed assembly and gives the strength capable of placing thereon the assembly of roll-form photographic light-sensitive materials.

EXAMPLE

Figures 1, 27:
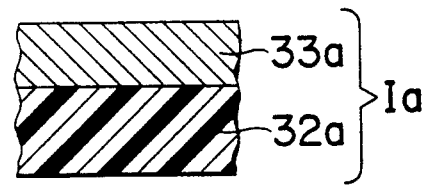
FIG. 1 is a schematic sectional view showing an example of the packed assembly of roll-form photographic light-sensitive materials of this invention.
FIG. 27 and FIG. 28 each is an enlarged partial sectional view showing a multilayer film being used as a light-shielding material or bag.

An example of the packed assembly of roll-form photographic light-sensitive materials of this invention is explained based on FIG. 1.

FIG. 1 is a schematic sectional view showing an example of the packaged assembly of roll-form photographic light-sensitive materials.

In FIG. 1, a supporting member 0 is composed of a pressure resisting member 1 and a light-shielding tray 7. The pressure resisting member 1 is composed of a relatively hard material, has a disk-like form, and a concave portion 51 for fixing the central post 2 in a free fit state near the center of the pressure resisting member. A column-like central post 2 is freely fitted in the concave portion 51 near the center of the pressure resisting member 1 and the post 2 is inserted in the cores 4 of roll-form photographic light-sensitive materials 3 to pile up plural roll-form light-sensitive materials on the pressure resisting member 1.

Between the roll-form photographic light-sensitive materials 3 are disposed separate sheets 5 composed of a light-shielding polypropylene resin sheet having a diameter slightly larger than that of the roll-form photographic light-sensitive material and a thickness of 1.2 mm. Also, the upper surface of the uppermost roll-form photographic light-sensitive materials 3 is covered by two protective sheets 6 and 6'.

By fixing the lower end of the central post 2 to the concave portion 51 near the center of the pressure resisting member 1 and also fixing the upper end of the post 2 with a flange cap 52 fixed between the two protective sheets 6 and 6', the movement or transfer of the packed assembly from the supporting member 0 is prevented.

Under the lower surface of the aforesaid pressure resisting member 1 is fixed a light-shielding tray 7. The light-shielding tray 7 is bent upward along the whole side wall of the pressure resisting member 1 and has formed there a concave groove 8. Also, a moistureproof light-shielding bag 9 covers the aforesaid assembly from above and is tied at the concaved groove 8 of the light-shielding tray 7 with a bond 10. In addition, numeral 13 shows a sealed portion of the light-shielding bag 9.

For making the aforesaid package, roll-form photographic light-sensitive materials 3 are set on the post 2 and placed on the pressure resisting member 1 in the case where the pressure resisting member 1, the central post 2 and the light-shielding tray 7 are fixed in a body or in the case where the light-shielding tray 7 is not fixed in a body, and after placing the protective sheets 6 and 6' on the uppermost part thereof, the light-shielding bag 9 covers then and is tied at the concave groove 8 portion with a band 10. In addition, the central post 2 is inserted through the open portions (holes) of the cores of the roll-form photographic light-sensitive materials after piling up the light-sensitive materials and may be fixed to the light-shielding pedestal or simply set in the concave portion 51 of the pressure resisting member 51 in a free state.

Furthermore, in another embodiment of this invention, the light-shielding tray only may be used without using the pressure resisting member.

In the case of taking out the roll-form photographic light-sensitive material 3, the band 10 is removed, the light-shielding bag is removed, and each roll-form photographic light-sensitive material is taken off the post.

Figures 2, 27:
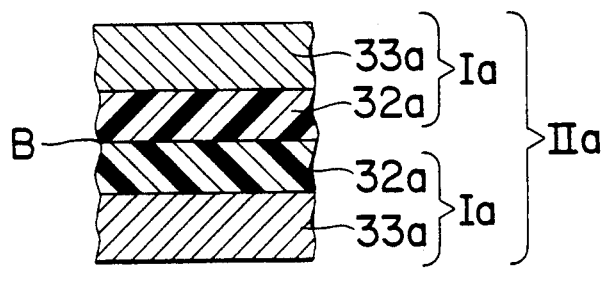
FIG. 2 is a schematic sectional view showing another example of the packed assembly of this invention.

FIG. 2 is a schematic sectional view showing an example of this invention wherein a pallet 11 and the supporting member 0 for the packed assembly is fixed each other. In the example, the package shown in FIG. 1 is placed on the pallet 11 and covered by a cylinder 12.

FIG. 3 is a schematic sectional view showing another embodiment of the packed assembly of this invention. In this example, a cylinder 12 is disposed in the inside of the moistureproof light-shielding bag 9 in the package shown in FIG. 1. In this case, a rectangular box may be used in place of the cylinder.

An example of the packed assembly of roll-form photographic light-sensitive materials according to a second embodiment of this invention is explained by referring to FIG. 4 to FIG. 7.

Figure 5:
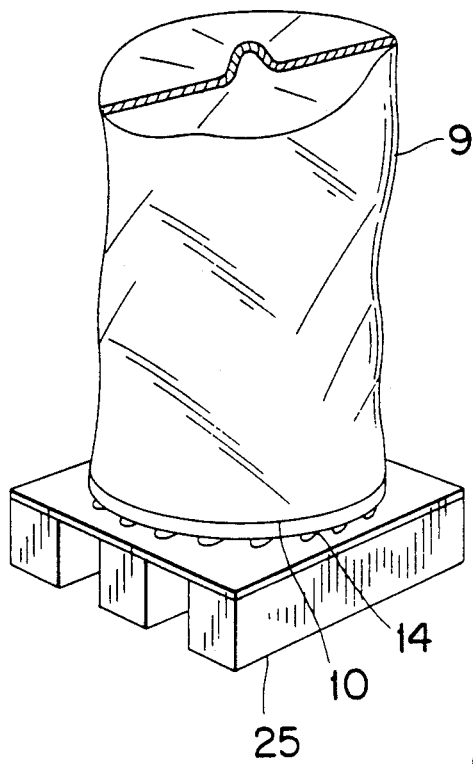
FIG. 5 is a slant view of the packed assembly shown in FIG. 4.
Figure 6:
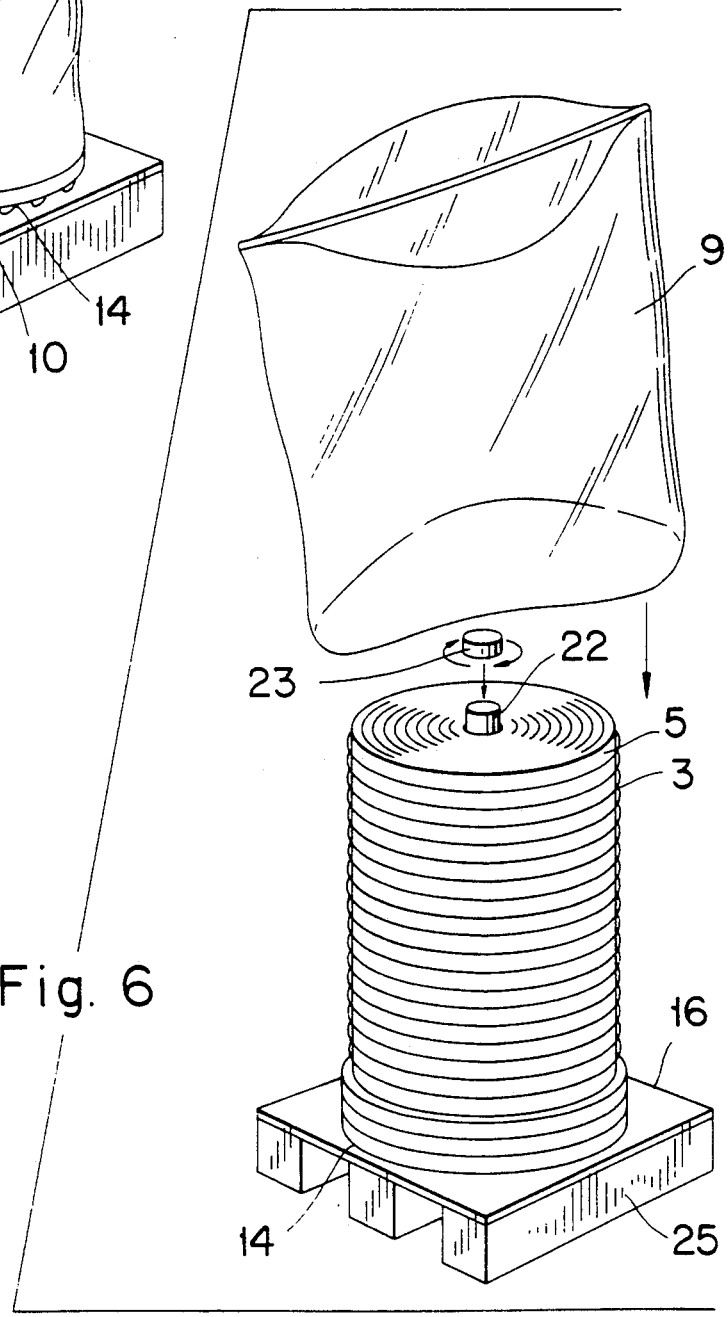
FIG. 6 is a schematic slant view showing the step of forming the packed assembly shown in FIG. 5.
Figure 7:
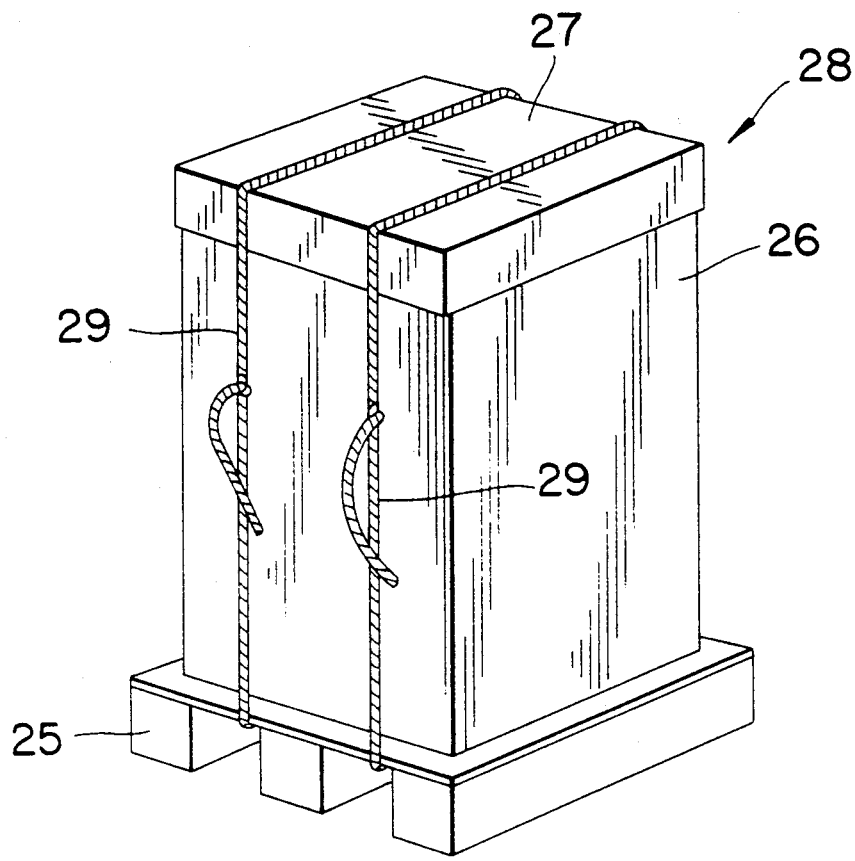
FIG. 7 is a slant view showing a final packaged state of the packed assembly of this invention.

FIG. 4 is a partially cut front view showing the packed assembly in this example, FIG. 5 is a slant view showing the aforesaid packed assembly, FIG. 6 is a slant view showing the stage of making the aforesaid packed assembly, and FIG. 7 is a slant view showing the final package form of the aforesaid packed assembly.

In FIG. 4 and FIG. 5, numeral 14 shows a supporting member and the supporting member 14 is composed of a pressure resisting member 15 fixed to a pallet by means of a nail 30 and a light-shielding pedestal 16 covering the pressure resisting member 15.

The light-shielding pedestal 16 is formed from and ABS resin or a polypropylene resin and is composed of a flat portion 17 and side face portion 18 extending downward from the periphery of the flat portion 17. Also, a concave portion 19 is formed at the center of the flat portion 17. Also, a concave portion 20 for a band is formed at almost the central portion of the side face portion 18 and also projecting portion 21 is formed.

On the upper surface of the flat portion 17 of the light-shielding pedestal 16 are piled up plural roll-form photographic light-sensitive materials 3, a rod-form central post 22 composed of a vinyl chloride resin is inserted into the cores 4 of the roll-form photographic light-sensitive materials 3, and the lower end portion of the post 22 is set in the concave portion 19 of the light-shielding pedestal 16 in a free fitted state. Between the roll-form photographic light-sensitive materials 3 . . . 3 are disposed separate sheets 5 composed of an embossed polypropylene resin sheet containing an antistatic agent and having a diameter slightly larger than that of the roll-form photographic light-sensitive material 3 and a thickness of 1.2 mm. Also, on the upper surface of the uppermost roll-form photographic light-sensitive material 3 are placed a protective sheet 6' and a flange cap-fixing sheet 6. Also, a flange cap 23 covers the upper end portion of the central post 22. It is preferred that the protective sheet 6' and the flange cap 23 have a light-shielding property in the interest of securing light-shielding for the light-sensitive materials.

The assembly of the roll-form photographic light-sensitive materials 3 is covered by a light-shielding bag 9 and the bag is tied with a band 10 composed of a polypropylene resin having a width of 10 mm at the portion corresponding to the concave portion 20 of the side face portion 18.

For making the package described above, as shown in FIG. 5 and FIG. 6, after first placing the supporting member 14 on a pallet 25, roll-form photographic light-sensitive materials 3 are successively piled up thereon through the separate sheet 5 between each roll-form photographic light-sensitive material 3 such that the position of the cores 4 thereof almost coincides with the concave portion 19 for central post, and then the protective sheet 6' covers thereon.

Then, the central post 22 is inserted through the cores 4 from above, the lower end thereof is fitted in the concaved portion 19 in a free fitted state, and thereafter, the flange cap covers the upper end thereof. Finally, a flange cap-fixing sheet 6 is placed thereon, whereby the pallet and the assembly of the photographic light-sensitive materials are set in a body and load shifting, etc., of the packed assembly does not occur even when a vibration or an impact is applied during the transportation thereof.

Then, the light-shielding bag 9 is placed over the assembly, and the lower portion is tied with the band 10 to finish the packed assembly of roll-form photographic light-sensitive materials as shown in FIG. 5.

The packed assembly is covered by a box 28 composed of wall portions 26 and a cover portion 27, the box is fixed to the pallet with bands 29, and the box is transported in this state.

Figure 8:
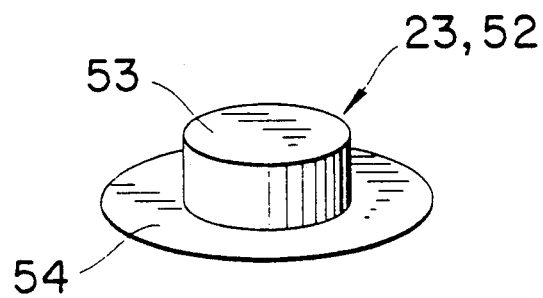
FIG. 8 is a side view showing an example of a flange cap for fixing the upper end of a central post.
Figure 14:
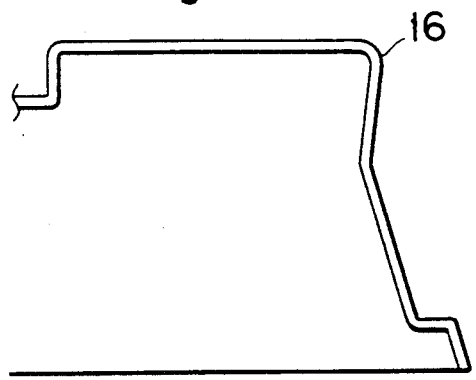
Figure 15:
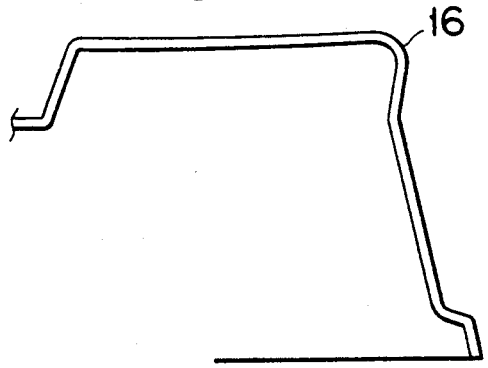
Figure 16:
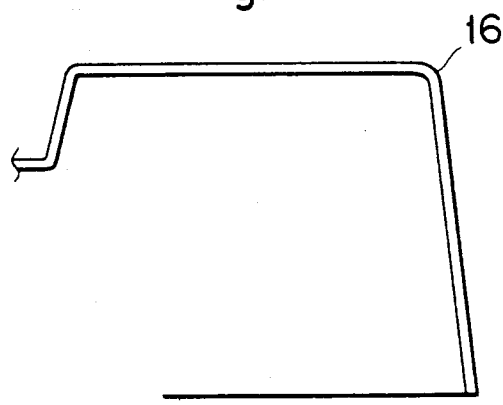
Figure 17:
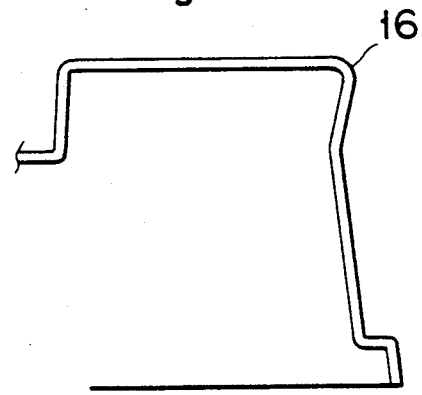
Figure 18:
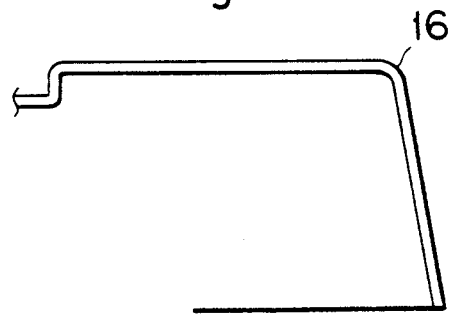
Figure 19:
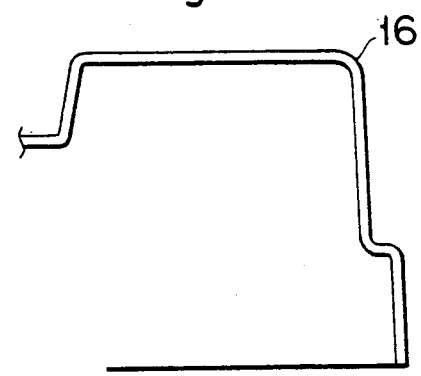
Figure 20:
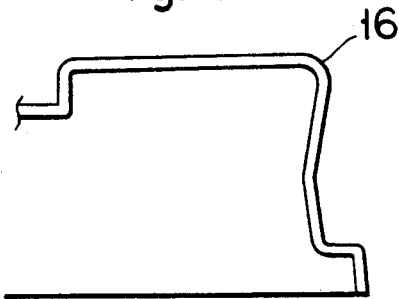
Figure 21:
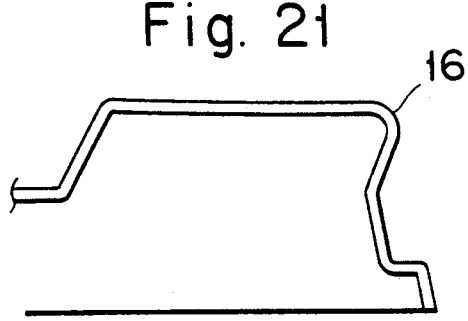
Figure 22:
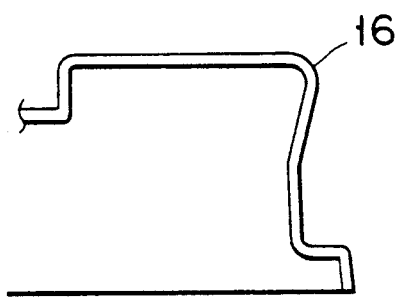
Figure 23:
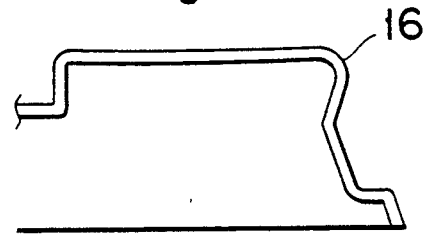
Figure 24:
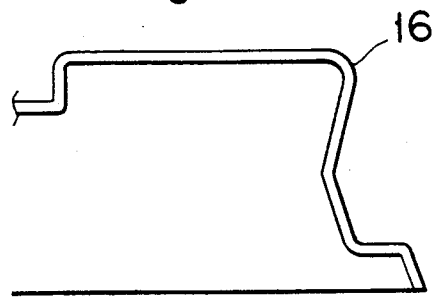

FIG. 8 is an enlarged slant view showing flange cap 23, 52. The flange cap 23, 52 is composed of a lid-fixed cylindrical portion 53 and a flange portion 54.

FIG. 9 to FIG. 25 are schematic partial sectional views each showing an example of the light-shielding pedestal 16 having various dimensions and form.

Figure 26:
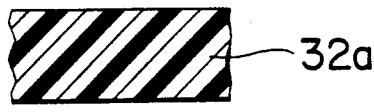
FIG. 26 is an enlarged partial sectional view showing a single layer film being used as a light-shielding material or bag.
Figure 28:
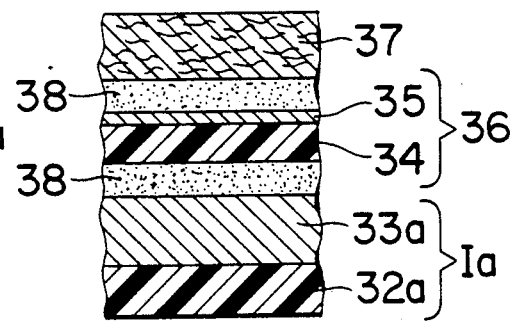
Figure 29:
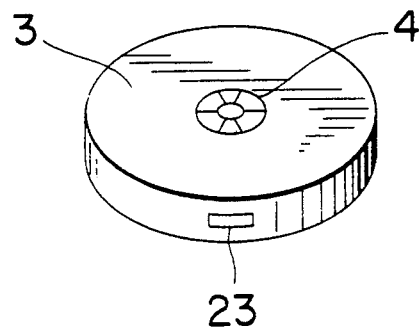
FIG. 29 is a schematic slant view showing a roll-form photographic light-sensitive material.

FIG. 26 is an enlarged partial sectional view showing a preferred single layer film which is used for the moistureproof light-shielding bag 9 for the packed assembly of this invention and FIG. 27 and FIG. 28 are enlarged partial sectional views each showing a preferred laminate film for the moistureproof light-shielding bag 9.

The film shown in FIG. 26 is a single layer ethylene-α-olefin copolymer resin film 32a having a light-shielding property.

The film shown in FIG. 27-2 is a light-shielding laminate film IIa formed by laminating two light-shielding double layer co-extruded films Ia Ia shown in FIGS. 27-1 at the light-shielding ethylene-α-olefin copolymer resin films 32a, 32a, by a blocking pseudo adhesive portion B.

FIG. 28 is an elongated partial sectional view showing a laminate film formed by laminating on both surfaces of an aluminum-vapor-deposited biaxially stretched thermoplastic resin film 36 composed of a biaxially stretched thermoplastic resin film 34 having an aluminum vapor-deposited layer 35, the light-shielding double layer co-extruded film Ia shown in FIG. 27-1 and a heat resisting flexible sheet (paper, nonwoven fabric, stretched film, etc.) 37 each through an adhesive layer 38.

In the aforesaid film, (a) added after the numeral shows that the layer contains a light-shielding material.

Then, the experimental results obtained by comparing the properties of the packages I, II, and III of this invention with conventional packages I and II are shown below.

Package I of this Invention

The package I of this invention is the packed assembly having the structure shown in FIG. 1.

The light-shielding pedestal 1 was composed of a polyvinyl chloride sheet having a thickness of 0.8 cm and the post 2 was a polyvinyl chloride rod having a diameter of 2.5 cm and a height of 75 cm.

The light-shielding tray 7 was prepared by a vacuum molding method using a propylene-ethylene block copolymer resin having a thickness of 1.5 mm and containing 0.5% by weight carbon black and the concave groove 8 had a width of 1 cm and a depth of 5 mm. The light-shielding tray was bonded to the pallet 11 with an adhesive such that they do not move during the transportation.

The moistureproof light-shielding bag 9 was a cylindrical bag composed of a single layer light-shielding inflation film of 120 μm in thickness composed of 3% by weight carbon black, 95% by weight L-LDPE resin (Ultzex 2020L, trade name, made by Mitsui Petrochemical Industries, Ltd.) which was a copolymer of ethylene with 4-methylpentene-1, and 2% by weight a high-density polyethylene resin (Hizex 3300F, trade name, made by Mitsui Petrochemical Industries, Ltd.).

The protective sheet 6′ was a polypropylene resin sheet containing 0.5% by weight furnace carbon black, having a thickness of 1.2 mm, both surfaces of the sheet being embossed.

The separate sheets 5 were polypropylene resin sheets having a thickness of 1.2 mm containing 0.5% by weight carbon black of low dusting property.

The flange cap 52 was formed by vacuum molding a light-shielding polypropylene resin sheet obtained by adding 20% by weight an ethylene-4-methylpentene-1 copolymer resin to a propylene-ethylene block copolymer resin of 1.2 mm in thickness containing 0.6% by weight furnace carbon black.

Also, the flange cap-fixing sheet 6 was a homo polypropylene resin sheet having a thickness of 25 mm.

The roll-form photographic light-sensitive film 3 was a positive movie film having a width of 35 mm and a length of 12,000 feet.

Conventional Package I

The conventional package I is the package having the structure shown in FIG. 30.

The roll-form photographic light-sensitive material 3 was a positive movie film having a width of 35 mm and a length of 2,000 feet.

As the packing bag 41, a light-shielding inflation film composed of 97% by weight high-pressure method branched low-density polyethylene resin and 3% by weight carbon black and having a thickness of 90 μm was used and the bottom portion was sealed by heat sealing. After placing the product (roll-form film) in the bag, the open portions were held and closed with an adhesive cotton tape. The packed bag was placed in a metal can 43 composed of a Zn-plated steel plate having a thickness of 300 μm and after placing a cover, the can was sealed by a white adhesive vinyl tape 44. Three such metal cans 43 were packed in a corrugated cardboard box 40 to provide the package.

Conventional Package II

The conventional package II is the package having the structure shown in FIG. 31.

The roll-form photographic light-sensitive material 3 was a positive movie film having a width of 35 mm and a length of 6,000 feet.

As the unitary bag 45, a laminate film formed by laminating a diagonally uniaxially oriented HDPE resin film having a thickness of 45 μm and containing 4.5% by weight carbon black to both surfaces of a foam polyethylene resin sheet having a thickness of 1 mm and an expansion ratio of 30 times so that the molecularly oriented axes were crossed at 90 degree with each other each through an adhesive layer of 15 μm in thickness formed by melt extruding a LDPE resin was used.

Each roll-form photographic light-sensitive material was placed in the unitary bag followed by sealing and 20 such unitary bags were packed in corrugated cardboard box to provide the package.

The results obtained are shown in FIG. 1 below.

TABLE 1

| Figure | Package I of Invention FIG. 1 | Conventional Package I FIG. 30 | Conventional Package II FIG. 31 | Evaluation |
|---|---|---|---|---|
| Cost for packed assembly | 28 (◎) | 100 (x) | 46 (○) | Cost for packaging materials per square meter of product when that of Conventional Package I is defined as 100. |
| Handling property in laboratory | Very excellent (◎) | No good (x) | Good ( ) | Evaluated from the load when each roll film is removed out from the packed assembly in the dark. |
| Production aptitude for packed assembly | Excellent (○) | No good (x) | Improvement necessary ( ) | Evaluated from the facility in the case of making the packed assembly in the dark (calculated per unit area of the product). |
| Correspondence of equipment and packaging materials to change of product size | Very excellent (◎) | No good (x) | Excellent (○) | Evaluated from the facility of the correspondence of the equipment and packaging materials necessary for making the packed assemblies having various sizes. |
| Amount of industrial waste | Very less (◎) | Many (x) | Less (○) | Evaluated from the amount of packaging material wastes in the |

TABLE 1-continued

| Figure | Package I of Invention FIG. 1 | Conventional Package I FIG. 30 | Conventional Package II FIG. 31 | Evaluation |
| --- | --- | --- | --- | --- |
| | | | | case of calculating per unit area of the product. |
| Load-shifting during transportation | Very less (⊚) | Good ( ) | Good ( ) | Evaluated by visual inspection after conducting the vibration |
| Rupture during transportation | Very less (⊚) | Good ( ) | Very less | test (Level II) of JIS Z-0232. |

Evaluations in Table 1 were carried out as follows.
⊚—Very excellent
◯—Excellent
—Practical
—Having a problem
x—Impractical

Package II of this Invention

The package II of this invention is the package having the structure shown in Table 4.

The roll-form photographic light-sensitive film 3 was a positive movie film having a width of 35 mm and a length of 12,000 feet around a core composed of a high impact polystyrene resin and having an inside diameter of 25 mm.

The light-shielding pedestal 16 was formed by a vacuum molding system using a light-shielding sheet having a thickness of 1.5 mm composed of an ABS resin containing 0.5% by weight carbon black, said light-shielding pedestal having an outside diameter of 870 mm, and inside diameter of 865 mm, and the inside diameter of the open portion of 877 mm.

As the pressure resisting member 15, a plywood having a thickness of 8 mm was cut into a disk having a diameter of 860 mm, and square lumber having a width of 20 mm, a height of 70 mm, and a length of 840 mm was fixed by nail to the aforesaid disk in a cross form. The pressure resisting member was fixed to the pallet 25 by a nail 30.

As the central post 22, a vinyl chloride resin rod having an outside diameter of 23.5 mm was used.

The separate sheet 5 was composed of a polypropylene resin sheet containing 0.8% by weight carbon black having a thickness of 1.2 mm, a diameter of 875 mm, and a diameter of the center hole of 25 mm, both surfaces of the sheet being crepe-embossed.

The light-shielding bag 9 was a bag of an inflation film formed by double layer co-extrusion, composed of an outer layer and an inner layer, having a bent diameter of 1390 mm, and the upper part was heated sealed at a width of 10 mm. The outer layer was a light-shielding L-LDPE series resin film having a thickness of 55 μm containing 92.25% by weight ethylene-4-methylpentene-1 copolymer resin having MI of 2.1 g/10 min and a density of 0.920 g/cm$^3$, 4.5% by weight a LDPE resin having MI of 2.4 g/10 min. and a density of 0.926 g/cm$^3$, 0.1% by weight synthetic silica, 0.05% by weight fatty acid amide, 0.1% by weight a phenolic antioxidant, and 3.0% by weight furnace carbon black. Also, the inner layer was a light-shielding HDPE-L-LDPE series resin film layer having a thickness of 55 μm containing 77.17% by weight an ethylene-4-methylpentene-1 copolymer resin (L-LDPE resin) having MI of 2.1 g/10 min. and a density of 0.920 g/cm$^3$, 15% by weight a HDPE resin having MI of 1.1 g/10 min. and a density of 0.954 g/cm$^3$, 4.5% by weight an LDPE resin having MI of 2.4 g/10 min. and a density of 0.926 g/cm$^3$, 0.08% by weight a synthetic silica, 0.05% by weight fatty acid amide, 0.1% by weight an alkylamine series nonionic surfactant, 0.1% by weight a phenolic antioxidant, and 3.0% by weight furnace carbon black.

The light-shielding bag 9 formed by heat sealing one of the aforesaid double layer co-extruded tube film covered the assembly from above and further the tube film the upper and lower ends of which were open further covered them (if one of the tube was sealed, the workability was reduced since air could not vent) and the upper and lower portions were tied to form a double moistureproof light-shielding package bag.

The closing band 10 was a polypropylene resin band having a width of 10 mm.

The flange cap 23, the protective sheet 6', and the flange cap fixing sheet 6 were same as those for the package I of this invention.

As compared with the conventional package II, in the package II of this invention, more than 60% of the material cost was saved, more than 30% of the container transporting cost could be saved, the number of the workers for packaging could be reduced to a half, and further the workers for processing could be reduced to ⅓.

As described above, in this invention, each roll-form photographic light-sensitive material is not contained in each bag or container but an assembly of many roll-form photographic light-sensitive materials is packed in a body in one or two light-shielding bags or container, whereby the packaging materials and the step number of packaging work can be greatly reduced to greatly reduce the cost, and each roll-form photographic light-sensitive material can be very easily taken out at processing.

While the invention has been described in detail and with reference to specific embodiments thereof, it will be apparent to one skilled in the art that various changes and modifications can be made therein without departing from the spirit and scope thereof.

What is claimed is:

1. A packed assembly of roll-form photographic light-sensitive materials comprising a substantially disk-shaped light-shielding supporting member fixed to a pallet, said light-shielding supporting member being composed of a combination of a pressure-resisting member fixed to the pallet and a light-shielding pedestal covering the pressure-resisting member, said combination having a concave portion near its center, an assembly of roll-form photographic light-sensitive materials having cores placed on said light-shielding supporting member in a stacked state, substantially disk-shaped separate sheets to separate rolls of photographic light-sensitive material from each other in said packed assembly of roll-form photographic light-sensitive materials, said separate sheets each having a core near its center and being in contact with the roll-form photographic light-sensitive materials, a central post inserted into the assembly through the cores of the photographic light-sensitive materials so that the ends of the post protrude from said assembly, a lower end of said central post being fixed to the concave portion of said light-shielding supporting member and an upper end of said central post being fixed to a flange cap, and light-shielding material closely packaging and assembly for securing light-shielding and moisture-proof properties of said assembly.

2. The packed assembly of roll-form photographic light-sensitive materials as claimed in claim 1, wherein each of said separate sheets has a diameter slightly larger than that of the roll-form photographic light-sensitive material and a central hole through which the central post has been inserted and said sheets being disposed between each roll-form photographic light-sensitive material of the assembly.

* * * * *